United States Patent
Gandolfi et al.

(10) Patent No.: US 12,299,596 B2
(45) Date of Patent: May 13, 2025

(54) METHOD, SYSTEM, AND CIRCUIT FOR EXTRACTING FEATURES FOR USE IN EMBEDDED ARTIFICIAL INTELLIGENCE MECHANISMS

(71) Applicant: STMICROELECTRONICS S.r.l., Agrate Brianza (IT)

(72) Inventors: Luca Gandolfi, Milan (IT); Marco Castellano, Pavia (IT); Marco Leo, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 922 days.

(21) Appl. No.: 17/360,977

(22) Filed: Jun. 28, 2021

(65) Prior Publication Data

US 2022/0414496 A1 Dec. 29, 2022

(51) Int. Cl.
*G06N 5/04* (2023.01)
*G01C 19/5712* (2012.01)
*G01P 1/00* (2006.01)
*G01P 15/08* (2006.01)
*G06N 20/00* (2019.01)

(52) U.S. Cl.
CPC ........... *G06N 5/04* (2013.01); *G01C 19/5712* (2013.01); *G01P 1/00* (2013.01); *G01P 15/08* (2013.01); *G06N 20/00* (2019.01)

(58) Field of Classification Search
CPC ...... G06N 5/04; G06N 20/00; G01C 19/5712; G01C 21/165; G01C 21/20; G01P 1/00; G01P 15/08; G06F 2207/4824; G06F 7/544

See application file for complete search history.

(56) References Cited

U.S. PATENT DOCUMENTS

| | | | |
|---|---|---|---|
| 5,543,858 | A | 8/1996 | Wischermann |
| 5,561,431 | A | 10/1996 | Peele et al. |
| 7,529,721 | B2 | 5/2009 | Jannarone et al. |
| 9,946,351 | B2 | 4/2018 | Sakaguchi et al. |
| 11,301,673 | B2 | 4/2022 | Chae et al. |
| 2011/0255794 | A1 | 10/2011 | Neogi et al. |

(Continued)

FOREIGN PATENT DOCUMENTS

| | | |
|---|---|---|
| CN | 106887115 A | 6/2017 |
| CN | 110070117 A | 7/2019 |

(Continued)

OTHER PUBLICATIONS

Chen et al., "Smartphone Sensor-Based Human Activity Recognition Using Feature Fusion and Maximum Full a Posteriori," *IEEE Transactions on Instrumentation and Measurement* 69(7):3992-4001, Jul. 2020.

(Continued)

*Primary Examiner* — Pei Yong Weng
(74) *Attorney, Agent, or Firm* — Seed IP Law Group LLP

(57) ABSTRACT

System, method, and circuitry for utilizing sequential input inertial sensor data to calculate recursive features for training a machine learning algorithm or for classifying the data as a known class. The recursive feature values of a current data sample are calculating based on comparisons between the current data sample value and previous recursive feature values. The recursive features include a recursive maximum, recursive minimum, recursive peak to peak, recursive average, recursive root mean square, and recursive variance.

16 Claims, 8 Drawing Sheets

(56) References Cited

U.S. PATENT DOCUMENTS

| | | |
|---|---|---|
| 2011/0257906 A1 | 10/2011 | Scherrer |
| 2013/0110478 A1 | 5/2013 | Saeed et al. |
| 2018/0053108 A1 | 2/2018 | Olabiyi et al. |
| 2018/0247107 A1 | 8/2018 | Murthy et al. |
| 2020/0257963 A1 | 8/2020 | Abhinav et al. |
| 2021/0103781 A1 | 4/2021 | Vigren et al. |
| 2022/0170794 A1 | 6/2022 | Castagna et al. |

FOREIGN PATENT DOCUMENTS

| | | |
|---|---|---|
| CN | 111176465 A | 5/2020 |
| CN | 112001110 A | 11/2020 |

OTHER PUBLICATIONS

"STHS34PF80: Low-power, high-sensitivity infrared sensor for presence and motion detection," Data brief, DB4312, Rev 1, STMicroelectronics, Dec. 2021. (13 pages).

METHOD, SYSTEM, AND CIRCUIT FOR EXTRACTING FEATURES FOR USE IN EMBEDDED ARTIFICIAL INTELLIGENCE MECHANISMS

BACKGROUND

Technical Field

The present disclosure generally relates to electronic devices of the type often used in embedded applications. More particularly, but not exclusively, the present disclosure relates to extracting sensor features for use in artificial intelligence mechanisms.

Description of the Related Art

Many mobile electronic devices, such as smartphones, include one or more inertial sensors to detect movement of the electronic device. The inertial data obtained from the inertial sensors can be used to rotate the display screen, control application functionality (e.g., control a character in a video game application, or detect fitness activity), "wake up" the device, etc. The inertial data can also be used to determine one or more movement activities of the user while the user is holding/wearing the electronic device. For example, the inertial data can be used to determine if the user is stationary (not moving), walking, or running. This type of movement activity can be determined based on the characteristics of the inertial data, such as the frequency and amplitude of specific inertial data. Such movement activity determinations can be used to improve interactions between the user and electronic device.

Typically, decision trees, finite state machines, or other machine learning models can be utilized to identify the activity from the inertial data. With these learning mechanisms, signals can be represented with a set of features (e.g., mean, variance, energy, frequency response) that contain information about the motion of the device containing the inertial sensors. Establishing these features to develop the learning mechanisms is generally a computationally-intensive process or can result in missed features. It is with respect to these and other considerations that the embodiments described herein have been made.

BRIEF SUMMARY

Embodiments described herein utilize sequential input inertial sensor data to calculate recursive features for use in training a machine learning algorithm or for use in classifying the data as a known class. The recursive feature values of a current data sample are calculating based on comparisons between the current data sample value and previous recursive feature values. The recursive features include a recursive maximum, recursive minimum, recursive peak to peak, recursive average, recursive root mean square, and recursive variance.

Other feature-extraction methods and systems may utilize overlapping data windows or sequential, non-overlapped windows. Unfortunately, features detection using non-overlapped windows is less flexible and can have problem with single event detection that occurs when the event happens between two windows. For example, if a user double taps an interface, if the first tap occurs during a first window and the second tap occurs during a second, non-overlapping window, then the system may see two separate single taps and miss the double tap. Feature detection using overlapping windows uses a sliding window to analyze the data over multiple samples. Although using overlapping windows can detect most signal events (e.g., a double tap), such an approach often utilizes more memory, computation time, and overall more power consumption.

Embodiments described herein result in similar benefits to the overlapping window approach, but utilize fewer computations and a smaller memory footprint, which results in less power consumption.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
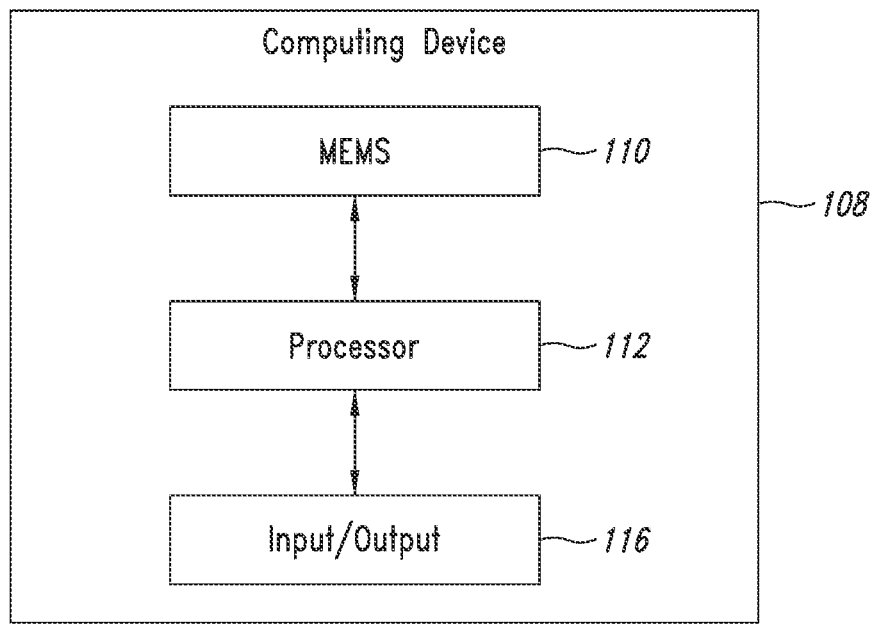
FIG. 1 is a block diagram showing an example computing device for implementing embodiments described herein.

FIG. 1 is a block diagram showing an example computing device 108 for implementing embodiments described herein. Computing device 108 includes a MEMS 110, a processor 112, and an input/output 116. Although not illustrated, computing device 108 may have other computing components.

MEMS 110 obtain various sensor data that is provided to processor 112 for processing. MEMS 110 may include accelerometers or gyroscopes configured to sense movement or positional data associated with the computing device 108. Although FIG. 1 shows the use of a MEMS, other sensing technologies or input sensors may also be used. Such other sensors may include, but are not limited to, a GPS system, a temperature sensor, a gas sensor, a pressure sensor, a magnetism sensor, imaging sensors, etc., or various combinations thereof.

Data obtained from MEMS 110 is provided to processor 112 for additional processing. The processor 112 includes one or more processing cores or circuits. The processor may comprise, for example, one or more processors, a state machine, a microprocessor, a programmable logic circuit, discrete circuitry, logic gates, registers, etc., and or various combinations thereof. The processor 112 may control overall operation of the computing device 108, execution of applications programs by the computing device 108, etc.

In some embodiments, the processor 112 may execute computer-readable instructions to perform embodiments described herein. In other embodiments, the processor 112 may include circuits or logic that can implement embodiments described herein. In yet other embodiments, other circuits or logic (not illustrated) that are separate from the processor 112 may be used to implement embodiments described herein.

The computing device 108 also includes one or more memories (not shown), such as one or more volatile or non-volatile memories, or a combination thereof, which may store, for example, all or part of instructions and data related to applications and operations performed by the computing device 108. For example, the memory may store computer instructions that when executed by the processor 108 perform the actions described herein. The memory also stores various information, including input data, thresholds, or coefficients, used to perform embodiments described herein.

The computing device 108 also includes input/output 116. The input/output 116 may be configured to output information or results obtained or determined by processor 112, such as by performing embodiments described herein. In other embodiments, input/output 116 may be configured to receive input data from other computing devices or external sensors.

The computing device 108 may also include a bus system (not illustrated), which may be configured such that the processor, MEMS 110, input/output 116, memories, or other circuits or circuitry (not illustrated) are communicatively coupled to one another to send or receive, or send and receive, data to or from other components. The bus system may include one or more of data, address, power, or control busses, or some combination thereof, electrically coupled to the various components of the computing device 108.

Although embodiments described herein may discuss identifying input signal figures for use in training a classification model, embodiments are not so limited. For example, the processor 112 (or a classification module (not illustrated)) of the computing device 108 may also be configured to use the recursive calculation embodiments described herein (e.g., calculating one or more of the recursive maximum, the recursive minimum, the recursive peak to peak, the recursive average, the recursive root mean square, or the recursive variance) to identify a plurality of input signal features that can be compared to a classification module (e.g., a classification module trained using the recursive calculation embodiments described herein) to identify a known class from a plurality of known classes. The recursively calculated features described herein provide a description or representation of the input signal. Therefore, the recursively calculated features can be used to train a machine learning mechanism, or the recursively calculated features can be used in combination with a previously trained machine learning mechanism to identify or classify the input signal as a known class.

Figure 2:
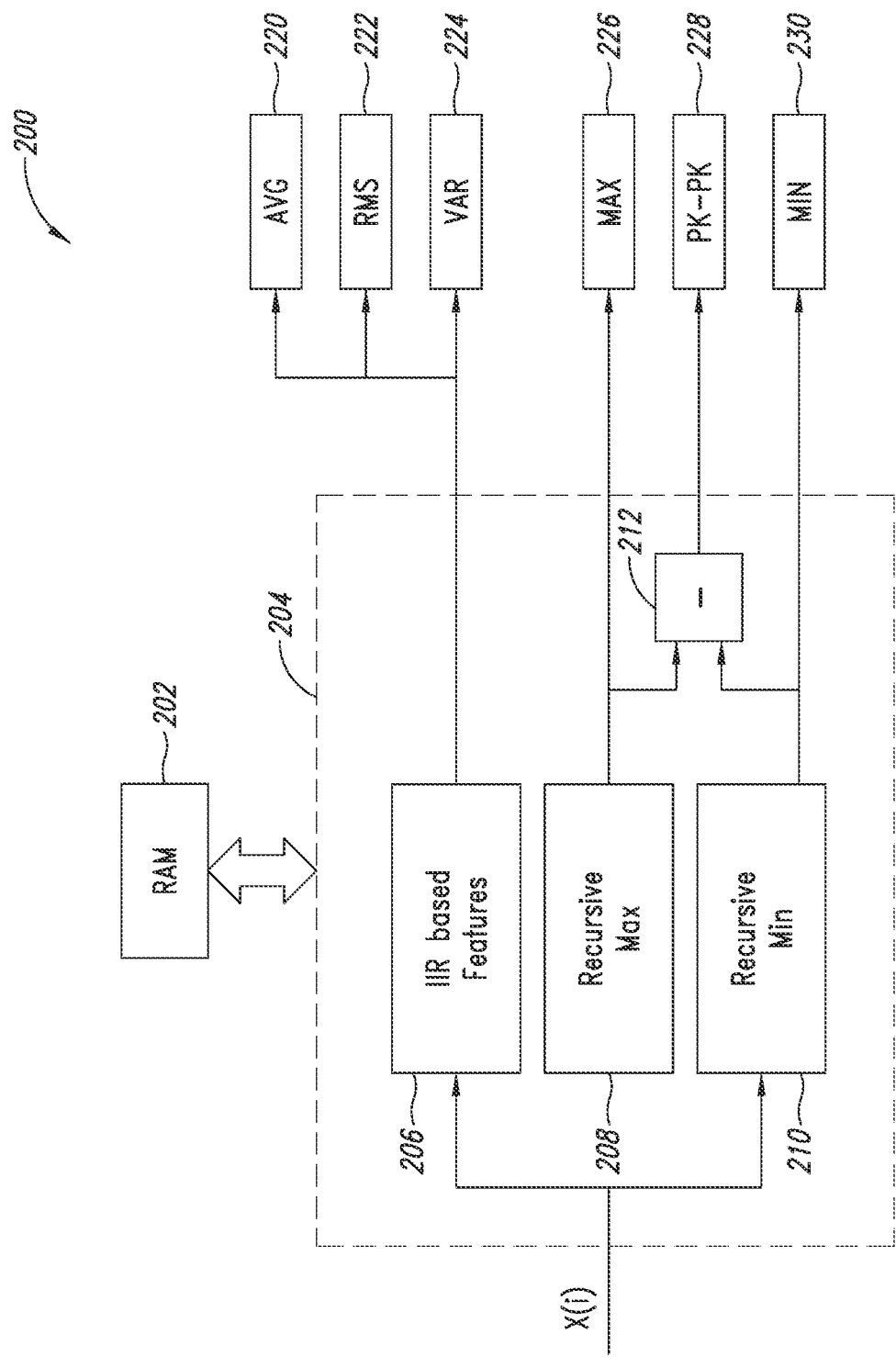
FIG. 2 is a conceptual block diagram showing an example of a feature extraction circuit structure in accordance with embodiments described herein.

FIG. 2 is a conceptual block diagram showing an example 200 of a feature extraction circuit structure 204 in accordance with embodiments described herein. The circuit structure 204 includes an infinite impulse response module 206, a recursive maximum module 208, a recursive minimum module 210, and a difference module 212. The feature extraction circuit structure 204 is also in communication with RAM 202, which can store various coefficients, thresholds, or other information or parameters that are used by the infinite impulse response module 206, the recursive maximum module 208, or the recursive minimum module 210.

The infinite impulse response module 206 receives an input data signal $x(i)$, such as inertial sensor data from MEMS 110 in FIG. 1. The infinite impulse response module 206 is configured to calculate and output a recursive average 220 of the input data signal $x(i)$, a recursive root mean square 222 of the input data signal $x(i)$, and a recursive variance 224 of the input data signal $x(i)$. Additional details of the infinite impulse response module 206 are discussed in more detail below in conjunction with FIG. 6.

The recursive maximum module 208 also receives the input data signal $x(i)$. The recursive maximum module 208 is configured to calculate and output a recursive maximum value 226 of the input data signal $x(i)$. Additional details of the recursive maximum module 208 are discussed in more detail below in conjunction with FIG. 3.

The recursive minimum module 210 receives the input data signal x(i). The recursive minimum module 210 is configured to calculate and output a recursive minimum value 230 of the input data signal x(i). Additional details of the recursive minimum module 210 are discussed in more detail below in conjunction with FIG. 4.

The difference module 212 receives the recursive maximum output from the recursive maximum module 208 and the recursive minimum output from the recursive minimum module 210. The difference module 212 is configured to calculate and output a peak-to-peak value 228 of the input data signal x(i).

Figure 3:
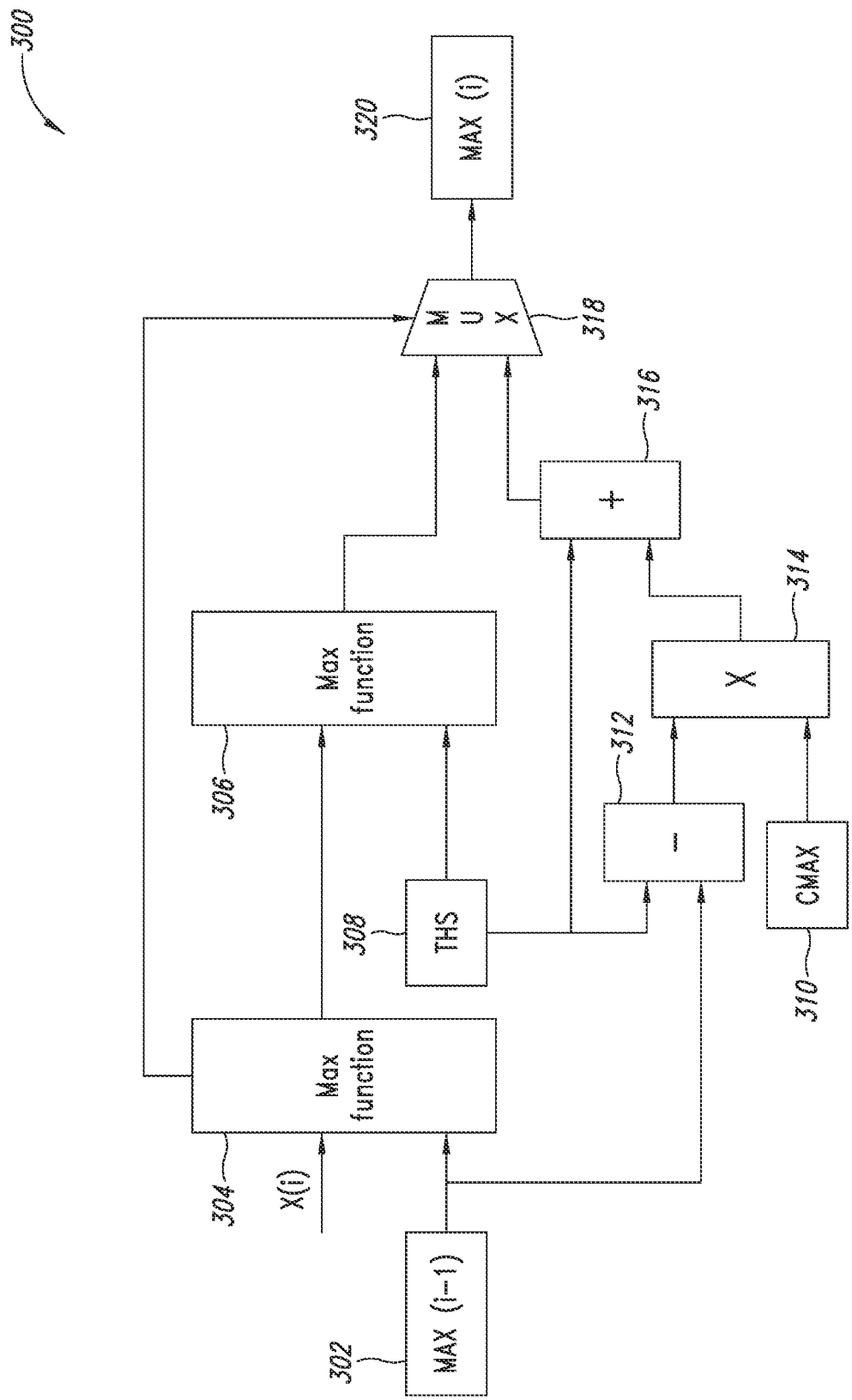
FIG. 3 is a conceptual block diagram showing an example of recursive maximum circuit structure in accordance with embodiments described herein.

FIG. 3 is a conceptual block diagram showing an example of recursive maximum circuit structure 300 in accordance with embodiments described herein. The recursive maximum circuit structure 300 may be an embodiment of recursive maximum module 208 in FIG. 2. The recursive maximum circuit structure 300 includes a first maximum function module 304, a second maximum function module 306, a difference module 312, a multiplier module 314, an adder module 316, and a multiplexer module 318.

The first maximum function module 304 receives an input data signal x(i) and a previous recursive maximum value 302. The first maximum function module 304 is configured to determine whether the current sample value of the input data signal x(i) is greater than the preceding recursive maximum value 302. This determination is provided as a selection signal to the multiplexer module 318. The first maximum function module 304 also outputs the maximum value between the current sample value of the input signal x(i) and the preceding recursive maximum value 302.

The second maximum function module 306 receives the maximum output from the first maximum function module 304 and a threshold 308. The threshold is a value set by a user or administrator to cause the recursive maximum value 320 to be not less than the threshold. The second maximum function module 306 is configured to generate an output that is a maximum value between the maximum output receives from the first maximum function module 304 and the threshold 308.

The difference module 312 receives the threshold 308 and the previous recursive maximum value 302. The difference module 312 is configured to generate an output that is a difference between the threshold 308 and the preceding recursive maximum value 302.

The multiplier module 314 receives the output from the difference module 312 and a maximum coefficient 310. The maximum coefficient 310 is set by a user or administrator to set how fast the reclusive maximum value 320 decreases when the current data sample of the input signal x(i) is less than the previous recursive maximum value 302. The multiplier module 314 is configured to generate an output that is a product of the output from the difference module 312 and the maximum coefficient 310.

The adder module 316 receives the threshold 308 and the output from the multiplier 314. The adder module 316 is configured to generate an output that is a sum of the output from the multiplier 314 and the threshold 308.

The multiplexer module 318 receives the output from the second maximum function module 306 and the output from the adder module 316 as input data lines. The multiplexer module 318 also receives the indication of whether the current data sample of the input signal x(i) is greater than the previous recursive maximum value 302 as a selection or control input line. The multiplexer module 318 is configured to select the output from the second maximum function module 306 as the recursive maximum value 320 in response to the output from the first maximum function module 304 indicating that the current sample value is greater than the preceding recursive maximum value 302. Conversely, the multiplexer module 318 is configured to select the output from the adder module 316 as the recursive maximum value 320 in response to the output from the first maximum function module 304 indicating that the current sample value is not greater than the preceding recursive maximum value 302.

Figure 4:
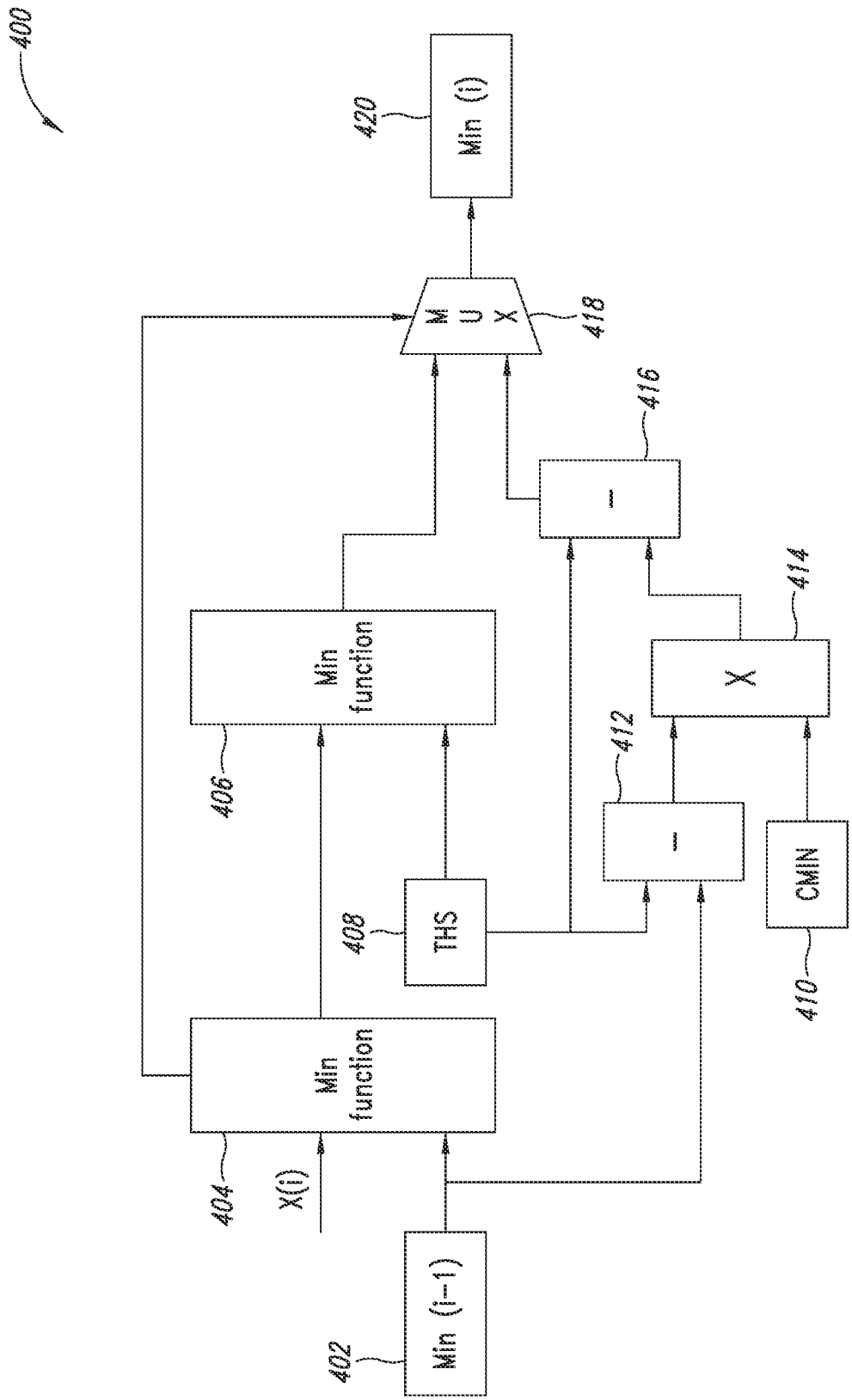
FIG. 4 is a conceptual block diagram showing an example of recursive minimum circuit structure in accordance with embodiments described herein.

FIG. 4 is a conceptual block diagram showing an example of recursive minimum circuit structure 400 in accordance with embodiments described herein. The recursive minimum circuit structure 400 may be an embodiment of recursive minimum module 210 in FIG. 2. The recursive minimum circuit structure 400 includes a first minimum function module 404, a second minimum function module 406, a first difference module 412, a multiplier module 414, a second difference module 416, and a multiplexer module 418.

The first minimum function module 404 receives an input data signal x(i) and a previous recursive minimum value 402. The first minimum function module 404 is configured to determine whether the current sample value of the input data signal x(i) is less than the preceding recursive minimum value 402. This determination is provided as a selection signal to the multiplexer module 418. The first minimum function module 404 also outputs the minimum value between the current sample value of the input signal x(i) and the preceding recursive minimum value 402.

The second minimum function module 406 receives the minimum output from the first minimum function module 404 and a threshold 408. The threshold is a value set by a user or administrator to cause the recursive minimum value 420 to be not greater than the threshold. The second minimum function module 406 is configured to generate an output that is a minimum value between the minimum output receives from the first minimum function module 404 and the threshold 408.

The first difference module 412 receives the threshold 408 and the previous recursive minimum value 402. The first difference module 412 is configured to generate an output that is a difference between the threshold 408 and the preceding recursive minimum value 402.

The multiplier module 414 receives the output from the first difference module 412 and a minimum coefficient 410. The minimum coefficient 410 is set by a user or administrator to set how fast the reclusive minimum value 420 increases when the current data sample of the input signal x(i) is greater than the previous recursive minimum value 402. The multiplier module 414 is configured to generate an output that is a product of the output from the first difference module 412 and the minimum coefficient 410.

The second difference module 416 receives the threshold 408 and the output from the multiplier 414. The second difference module 416 is configured to generate an output that is a difference between the threshold 408 and the output from the multiplier 414.

The multiplexer module 418 receives the output from the second minimum function module 406 and the output from the second difference module 416 as input data lines. The multiplexer module 418 also receives the indication of whether the current data sample of the input signal x(i) is less than the previous recursive minimum value 402 as a selection input line. The multiplexer module 418 is configured to select the output from the second minimum function module 406 as the recursive minimum value 420 in response to the output from the first minimum function module 404 indicating that the current sample value is less than the preceding recursive minimum value 402. Conversely, the multiplexer module 418 is configured to select the output from the second difference module 416 as the recursive minimum value 420 in response to the output from the first minimum function module 404 indicating that the current sample value is not less than the preceding recursive minimum value 402.

Figure 5:
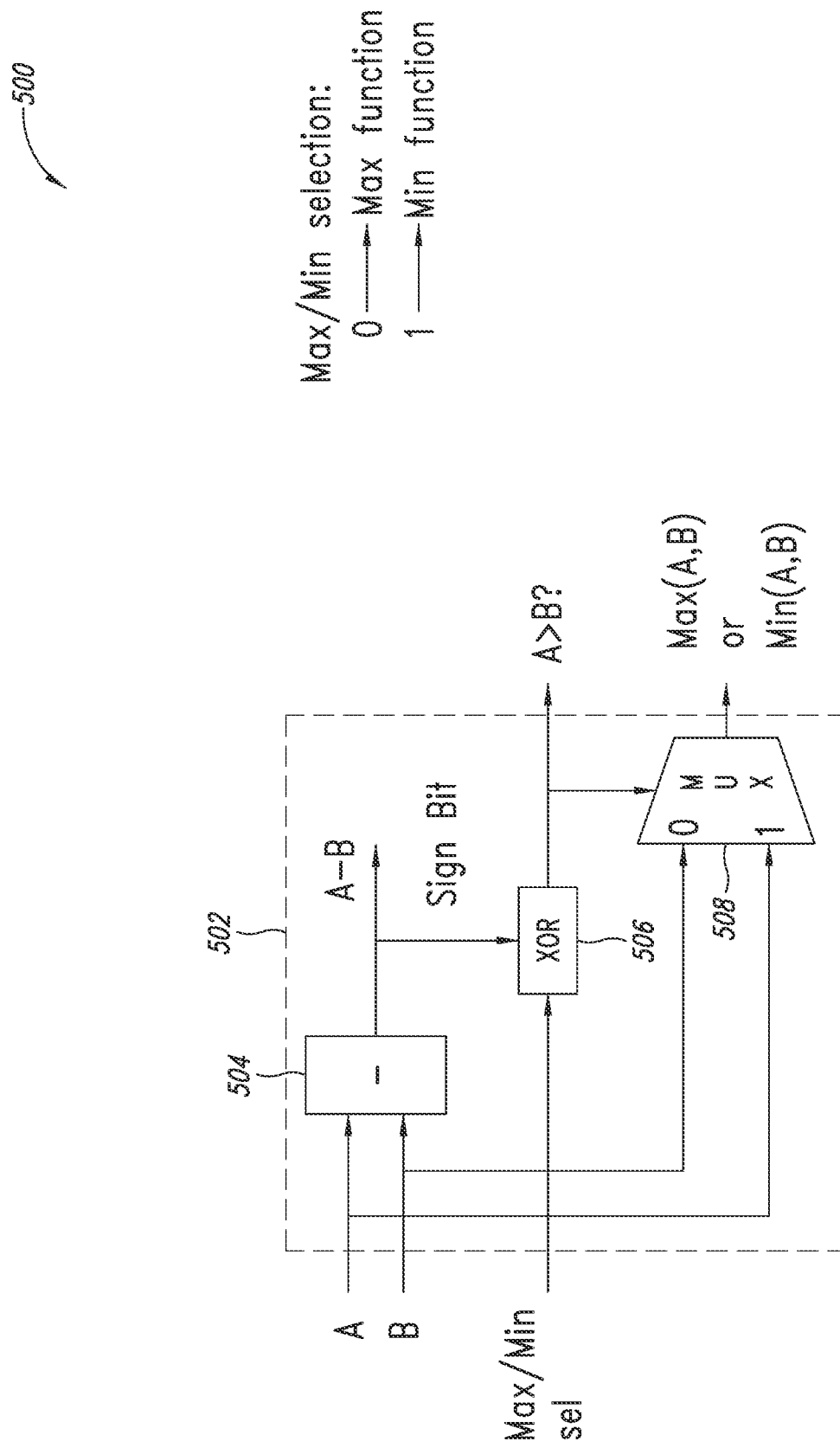
FIG. 5 is a conceptual block diagram showing an example of a circuit structure for selecting between performing a minimum and maximum function and in accordance with embodiments described herein.

FIG. 5 is a conceptual block diagram showing an example 500 of a circuit structure 502 for selecting between performing a minimum and maximum function and in accordance with embodiments described herein. As discussed above, the recursive maximum circuit structure 300 in FIG. 3 utilizes two maximum function modules 304 and 306 mentioned and the recursive minimum circuit structure 400 in FIG. 4 utilizes two minimum function modules 404 and 406. In some embodiments, the circuit structure 502 may be utilized to perform the minimum or maximum determination based on a minimum/maximum selection input.

The circuit structure 502 includes a difference module 504, an XOR module 506, and a multiplexer 508. The difference module 504 receives two inputs labeled "A" and "B". In some situations where the circuit structure 502 is the maximum function module 304 in FIG. 3, input A may be input signal x(i) in FIG. 3 and input B may be the previous recursive maximum value 302 in FIG. 3; where the circuit structure 502 is the maximum function module 306 in FIG. 3, input A may be the output from the maximum function module 304 in FIG. 3 and input B may be the threshold 308 in FIG. 3. In other situations where the circuit structure 502 is the minimum function module 404 in FIG. 4, input A may be input signal x(i) in FIG. 4 and input B may be the previous recursive minimum value 402 in FIG. 4; where the circuit structure 502 is the minimum function module 406 in FIG. 4, input A may be the output from the minimum function module 404 in FIG. 4 and input B may be the threshold 408 in FIG. 4.

The difference module 504 is configured to calculate a difference between input A and input B (A–B) and output a 1 or zero depending on whether the result of the difference is positive or negative. If the result is positive, then the difference module 504 outputs a 1, and if the result is negative, then the difference module 504 outputs a 0. This sign bit output is provided to the XOR module 506.

The XOR module 506 receives the sign bit from the difference module 504 and receives a maximum or minimum selection input (0 or 1) dependent on whether the minimum function is used or the maximum function is used. In various embodiments, a 0 is input when the maximum function is used, such as maximum function module 304 or maximum function module 306 in FIG. 3, and a 1 is input when the minimum function is used, such as minimum function module 404 or minimum function module 406 in FIG. 4. The output of the XOR module 506 indicates whether the value of input A is greater than the value of input B, where a 1 indicates that input A is greater than input B. This output is provided to multiplexer module 508 as the selection input bit.

The multiplexer module 508 receives data inputs A and B, where data input A aligns with selection input 1 of the multiplexer module 508 and data input B aligns with selection input 0 of the multiplexer module 508. If the output of the XOR 506 is a 1, then data input A is output from the circuit structure 502, and if the output of the XOR 506 is a 0, then data input B is output from the circuit structure 502.

Figure 6:
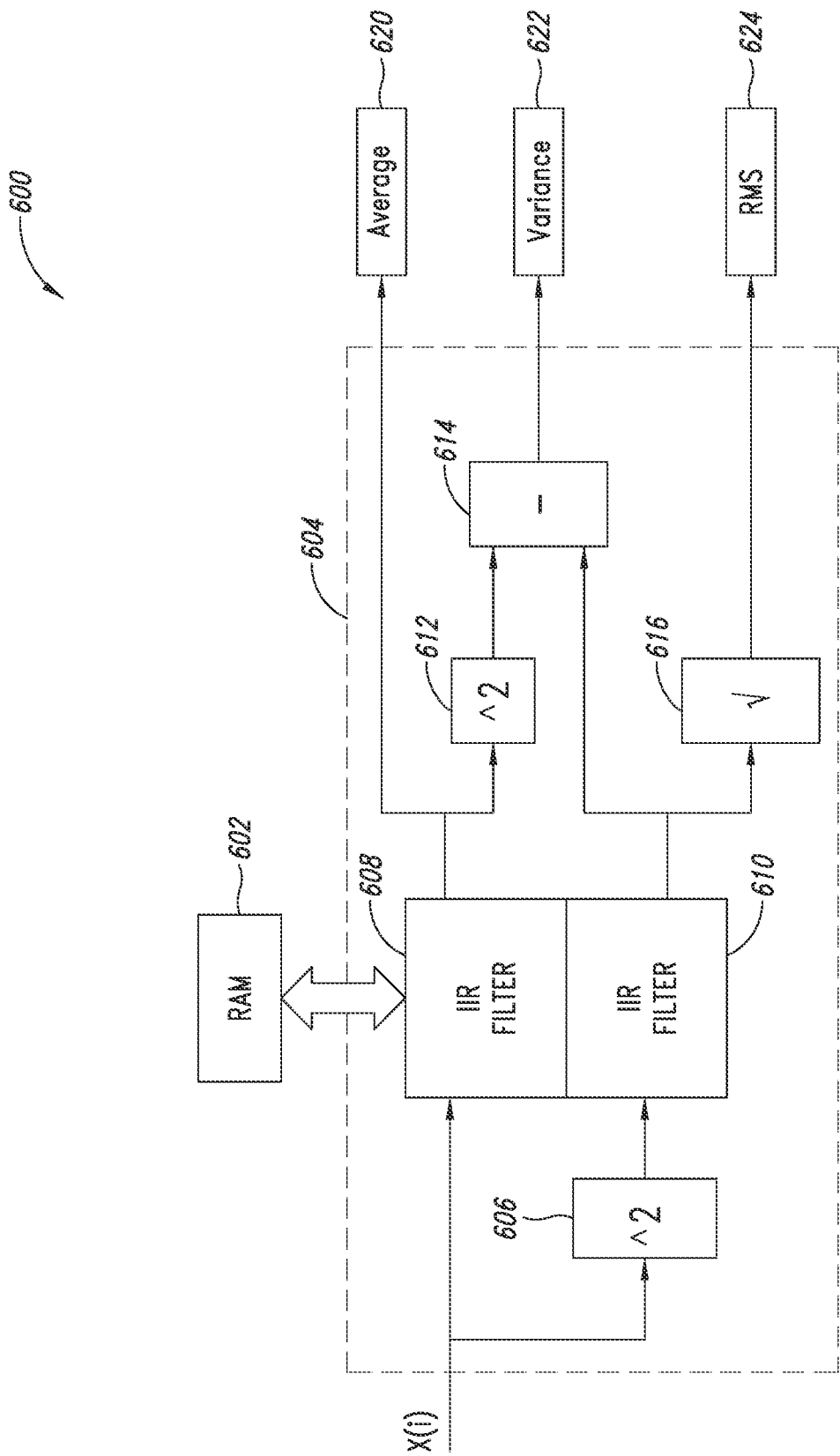
FIG. 6 is a conceptual block diagram showing an example of an infinite-impulse-response-based circuit structure in accordance with embodiments described herein.

FIG. 6 is a conceptual block diagram showing an example 600 of an infinite-impulse-response-based circuit structure 604 in accordance with embodiments described herein. The infinite-impulse-response-based circuit structure 604 includes a first infinite-impulse-response filter module 608, a second infinite-impulse-response filter module 610, a first square module 606, a second square module 612, a difference module 614, and a square-root module 616.

The first infinite-impulse-response filter module 608 receives the data input x(i) and is configured to calculate a first infinite impulse response output signal. This output signal is the recursive average 620. The first infinite-impulse-response filter module 608 may also receive various parameters or configuration information from RAM 602.

The first square 606 also receives the data input x(i) and is configured to calculate a square of the data input signal, which is output to the second infinite-impulse-response filter module 610. The second infinite-impulse-response filter module 610 is configured to calculate a second infinite impulse response output signal. The second infinite-impulse-response filter module 610 may also receive various parameters or configuration information from RAM 602.

The square-root module 616 receives the output signal from the second infinite-impulse-response filter module 610. The square-root module 616 is configured to calculate a square root of the second infinite impulse response output signal, which is the recursive root mean square 624.

The second square module 612 receives the first infinite impulse response output signal from the first infinite-impulse-response filter module 608. The second square module 612 is configured to calculate a square of the first infinite impulse response output signal.

The difference module 614 receives the output from the second square module 612 and the second infinite impulse response output signal from the second infinite-impulse-response filter module 610. The difference module 614 calculates a difference between the squared first infinite impulse response output signal and the second infinite impulse response output signal. The output of the difference module 614 is the recursive variance 622.

The components, modules, or other features shown in FIGS. 2-6 may include or be made up of one or more logical gates or their functionality may be performed by one or more processing units.

The operation of one or more embodiments will now be described with respect to FIGS. 7 and 8, and for convenience will be described with respect to the embodiments of FIGS. 1-6 described above. In at least one of various embodiments, processes 700 and 800 described in conjunction with FIGS. 7 and 8, respectively, may be implemented by or executed on one or more computing devices, such as computing device 108 in FIG. 1.

Figure 7:
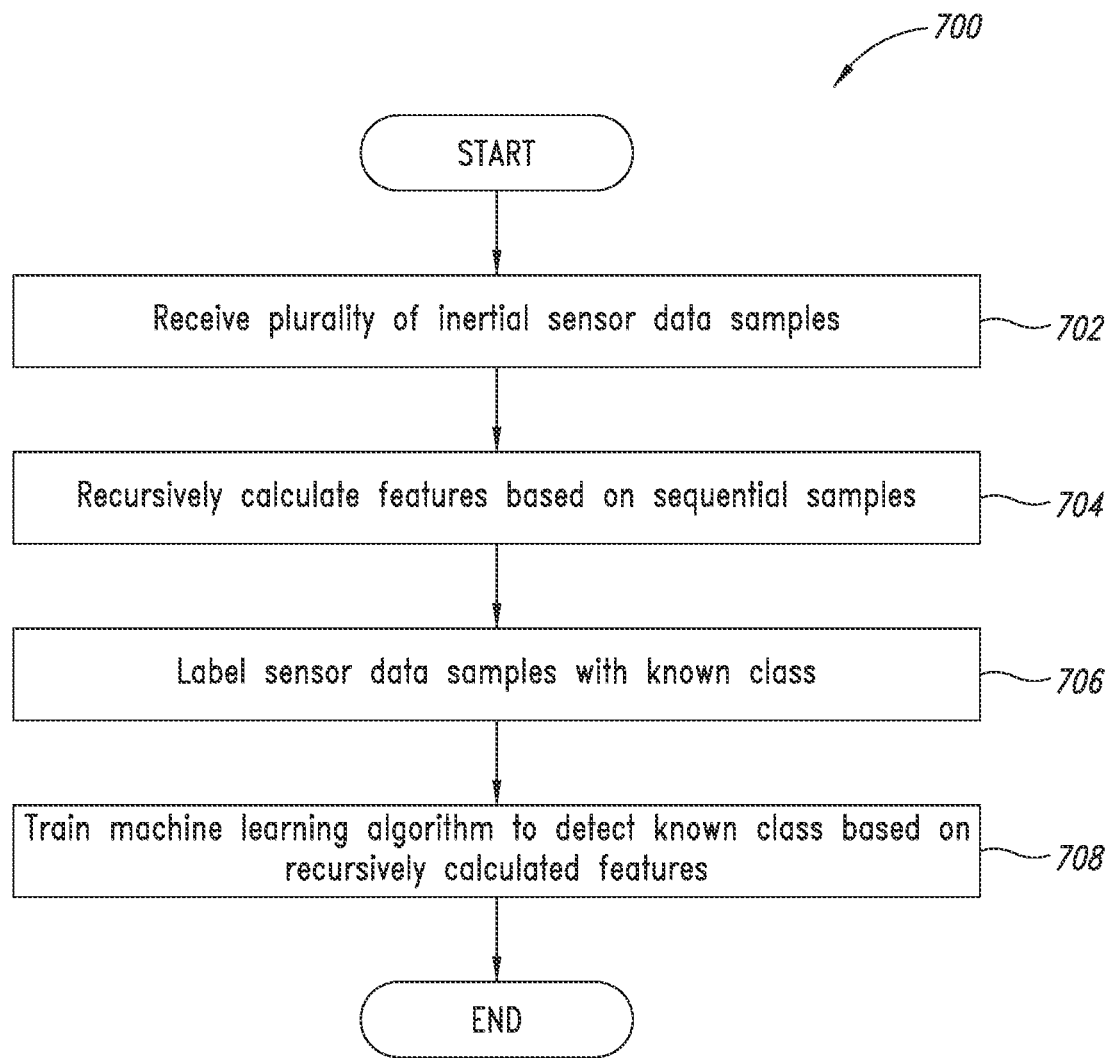
FIG. 7 shows a logical flow diagram of an overview process for training a machine learning algorithm from recursive features in accordance with embodiments described herein.

FIG. 7 shows a logical flow diagram of an overview process 700 for training a machine learning algorithm from recursive features in accordance with embodiments described herein.

Process 700 begins, after a start block, at block 702, where a plurality of inertial sensor data samples are received over time. As indicated above, the inertial sensor data may include a plurality of samples that are captured by an accelerometer, gyroscope, or other inertial sensor at set or predetermined time intervals. The plurality of inertial sensor data samples may also be referred to as the input signal or input inertial data signal.

Process 700 proceeds to block 704, where a plurality of features are recursively calculated based on sequential samples obtained from the plurality of received inertial sensor data samples, which is described in more detail below in conjunction with FIG. 8.

Process 700 continues at block 706, where the received sensor data samples are labeled with a known class. Examples of known classes may be walking, jogging, biking, resting, etc. In at least one embodiment, a user or administrator provides an input that labels the sensor data with the known class.

Process 700 proceeds next to block 708, where a machine learning algorithm or finite state machine is trained to detect the known class based on the recursively calculated features. In various embodiments, known machine learning training techniques may be employed to generate a predictive model for the known class based on the recursively calculated features.

After block 708, process 700 terminates or otherwise returns to a calling process to perform other actions. Although not illustrated, process 700 may loop to block 702 to receive additional inertial sensor data, which may be used to recursively calculate features for other known classes.

Figure 8:
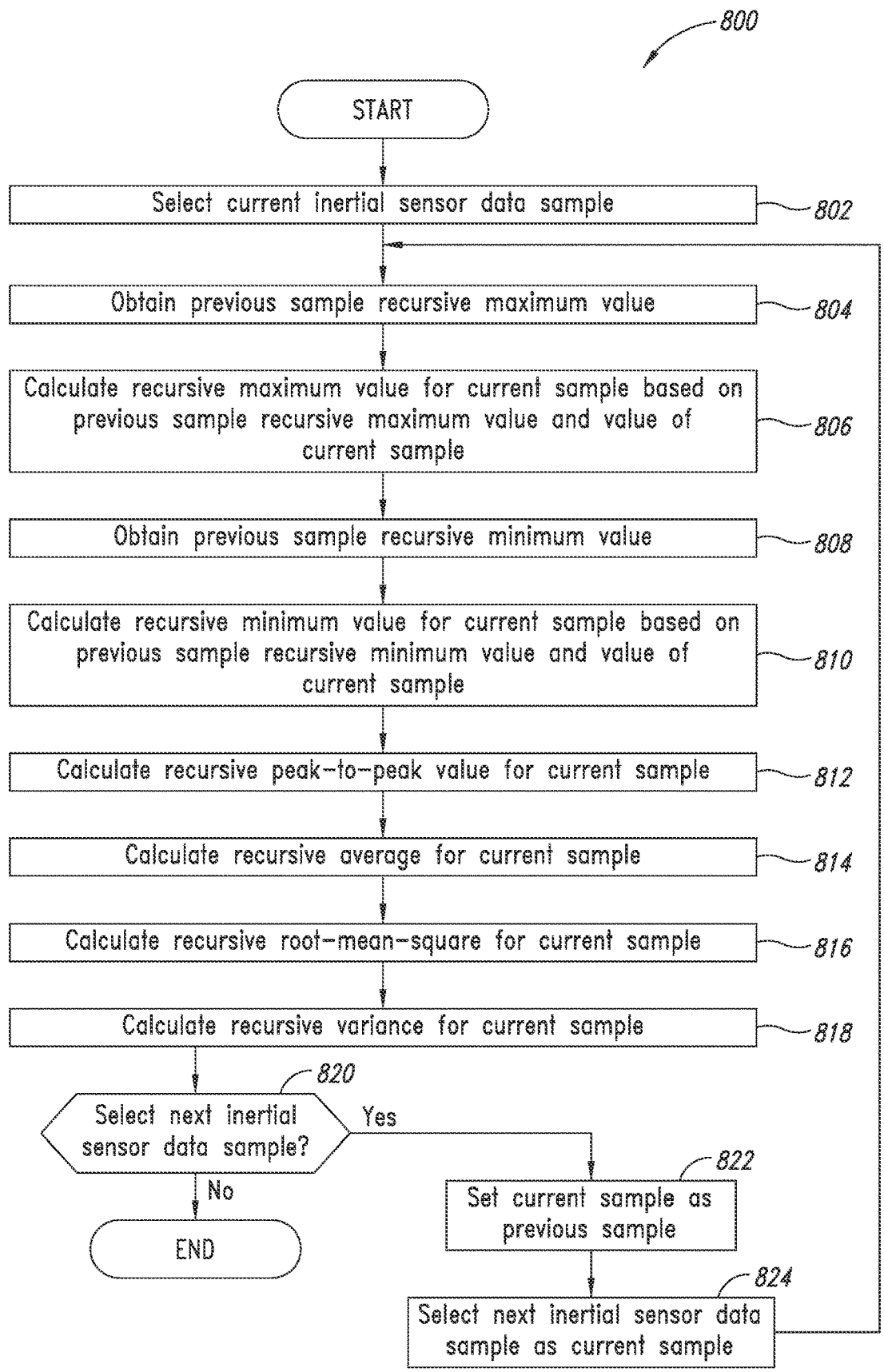
FIG. 8 shows a logical flow diagram of a process for recursively calculating features of an inertial sensor signal in accordance with embodiments described herein.

FIG. 8 shows a logical flow diagram of a process 800 for recursively calculating features of an inertial sensor signal in accordance with embodiments described herein.

Process 800 begins, after a start block, at block 802, where a current inertial sensor data sample is selected.

Process 800 proceeds to block 804, where a previous sample recursive maximum value is obtained. In various embodiments, the previous sample recursive maximum value was calculated for an inertial sensor data sample that immediately preceded the current sample using embodiments described herein.

Process 800 continues at block 806, where a recursive maximum value is calculated for the current sample. In various embodiments, this recursive maximum value is calculated based on the previous sample recursive maximum value and a value of the current sample.

For example, if the value of the current sample is less than the threshold value, then the recursive maximum value for the current sample is set to a threshold value. If the value of the current sample is greater than the preceding recursive maximum value for the preceding sample, then the recursive maximum value for the current sample is set to the value of the current sample. And if the value of the current sample is less than or equal to the preceding recursive maximum value, then the recursive maximum value for the current sample is set to a sum of the threshold value with the preceding recursive maximum value less the threshold value multiplied by a maximum coefficient. In various embodiments, if the value of the current sample being greater than the preceding recursive maximum value, then the maximum coefficient is set to a default coefficient value. And if the value of the current sample being less than or equal to the preceding recursive value, then the maximum coefficient is set to a product of the maximum coefficient and the default coefficient value.

These calculations and determinations are made in accordance with the following equations:

If $x_i > \text{Max}_{i-1}$ $\text{Max}_i = x_i$ $c_{max} = c_{start}$

If $x_i \leq \text{Max}_{i-1}$:

$\text{Max}_i = THS + (\text{Max}_{i-1} - THS) \cdot c_{max}$ $c_{max} = c_{max} c_{start}$ If $\text{Max}_i < THS$:

$\text{Max}_i = THS$ where,
- $x_i$ is the value of the current inertial sensor data sample i;
- THS is a threshold maximum value set by an administrator;
- $\text{Max}_i$ is the recursive maximum value of the current inertial sensor data sample i;
- $\text{Max}_{i-1}$ is the preceding recursive maximum value of the previous inertial sensor data sample i−1;
- $c_{start}$ is the default maximum coefficient set by an administrator to indicate how fast the recursive maximum decreases, and is set between 0 and 1; and
- $c_{max}$ is the current maximum coefficient.

Process 800 proceeds to block 808, where a previous sample recursive minimum value is obtained. In various embodiments, the previous sample recursive minimum value was calculated for an inertial sensor data sample that immediately preceded the current sample using embodiments described herein.

Process 800 proceeds next to block 810, where a recursive minimum value is calculated for the current sample. In various embodiments, this recursive minimum value is calculated based on the previous sample recursive minimum value and a value of the current sample.

For example, if the value of the current sample is greater than the threshold value, then the recursive minimum value for the current sample is set to a threshold value. If the value of the current sample is less than the preceding recursive minimum value for the preceding sample, then the recursive minimum value for the current sample is set to the value of the current sample. And if the value of the current sample is greater than or equal to the preceding recursive minimum value, then the recursive minimum value for the current sample is set to a difference of the threshold value with the threshold value less the preceding recursive minimum value multiplied by a minimum coefficient. In various embodiments, if the value of the current sample being less than the preceding recursive minimum value, then the minimum coefficient is set to a default coefficient value. And if the value of the current sample being greater than or equal to the preceding recursive value, then the minimum coefficient is set to a product of the minimum coefficient and the default coefficient value.

These calculations and determinations are made in accordance with the following equations:

If $x_i < \text{Min}_{i-1}$ $\text{Min}_i = x_i$ $c_{min} = c_{start}$

If $x_i \leq \text{Min}_{i-1}$:

$\text{Min}_i = THS + (THS - \text{Min}_{i-1}) \cdot c_{min}$ $c_{min} = c_{min} c_{start}$ -continued If $Max_i > THS$:

$Min_i = THS$ where,
- $x_i$ is the value of the current inertial sensor data sample i;
- THS is a threshold minimum value set by an administrator;
- $Min_i$ is the recursive minimum value of the current inertial sensor data sample i;
- $Min_{i-1}$ is the preceding recursive minimum value of the previous inertial sensor data sample i–1;
- $c_{start}$ is the default minimum coefficient set by an administrator to indicate how fast the recursive minimum decreases, and is set between 0 and 1; and
- $c_{min}$ is the current minimum coefficient.

Process 800 continues next at block 812, where a recursive peak-to-peak value is calculated for the current sample. In various embodiments, the recursive peak-to-peak is the difference between the recursive maximum value for the current sample and the recursive minimum value of the current sample.

Process 800 proceeds to block 814, where a recursive average is calculated for the current sample. In various embodiments, the recursive average is calculated using an infinite impulse response low pass filter over the plurality of inertial sensor data samples. This calculation and determination is made in accordance with the following equation:

$$Average_i = IIR_{LP}[x_i]$$

where,
where,
- Average is the recursive average for the current inertial sensor data sample i;
- $x_i$ is the value of the current inertial sensor data sample i; and
- $IIR_{LP}$ is an infinite impulse response low pass filter over the inertial data signal up current inertial sensor data sample i.

Process 800 continues at block 816, where a recursive root-mean-square is calculated for the current sample. In various embodiments, the recursive root-mean-square is calculated using an infinite impulse response low pass filter over a square of the plurality of inertial sensor data samples. This calculation and determination is made in accordance with the following equation:

$$RMS_i = \sqrt{IIR_{LP}[x_i^2]}$$

where,
where,
- RMS is the recursive root mean square for the current inertial sensor data sample i;
- $x_i$ is the value of the current inertial sensor data sample i; and
- $IIR_{LP}$ is an infinite impulse response low pass filter over the inertial data signal up current inertial sensor data sample i.

Process 800 continues at block 818, where a recursive variance is calculated for the current sample. In various embodiments, the recursive variance is calculated from a difference between a first infinite impulse response low pass filter over a square of the plurality of inertial sensor data samples and a squared second infinite impulse response low pass filter over the plurality of inertial sensor data samples. This calculation and determination is made in accordance with the following equation:

$$Variance_i = IIR_{LP}[x_i^2] - IIR_{LP}^2[x_i]$$

where,
where,
- Variance is the recursive variance for the current inertial sensor data sample i;
- $x_i$ is the value of the current inertial sensor data sample i; and
- $IIR_{LP}$ is an infinite impulse response low pass filter over the inertial data signal up current inertial sensor data sample i.

Process 800 continues next at decision block 820, where a determination is made whether another inertial sensor data sample is to be selected. In at least one embodiment, a next inertial sensor data sample is to be selected if additional data is being or has been received from the inertial sensor. If another inertial sensor data sample is to be selected, process 800 flows to block 822; otherwise, process 800 terminates or otherwise returns to a calling process to perform other actions;

At block 822, the current sample is set as the previous sample.

Process 800 then proceeds to block 824, where the next inertial sensor data sample is selected as the current sample.

Process 800 loops to block 804 to calculate the recursive maximum value, the recursive minimum value, the recursive peak-to-peak value, the recursive average, the recursive root mean square, and the recursive variance for the new current sample.

Process 800 continues to loop until all inertial sensor data is processed or until stopped by an administrator or other process.

Although process 800 is described as sequential steps in a particular order, embodiments are not so limited. For example, two or more of the recursive maximum value, the recursive minimum value, the recursive peak-to-peak value, the recursive average, the recursive root mean square, and the recursive variance could be determined in parallel or in an order other than that which is shown.

As mentioned above, the calculations of the recursive maximum, the recursive minimum, the recursive peak to peak, the recursive average, the recursive root mean square, and the recursive variance described in FIG. 8 can also be used to classify the input sensor data signal as a known class based on a comparison between the recursively calculated features and a trained classification model or trained machine learning mechanism.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

The headings and Abstract of the Disclosure provided herein are for convenience only and do not limit or interpret the scope or meaning of the embodiments.

A method, may be summarized as including: receiving a plurality of inertial sensor data samples over time; recursively calculating a plurality of features over time based on an analysis of sequential samples of the plurality of inertial sensor data samples, including: for each current sample of the plurality of inertial sensor data samples, calculating a current feature value for each corresponding feature of the plurality of features based on a comparison between a previous recursive feature value for the corresponding feature and the current sample; labeling the plurality of inertial sensor data samples with a known class; and training a machine learning algorithm to detect the known class based on the calculated plurality of features over time. Recursively calculating the plurality of features over time may include calculating a recursive maximum value over the plurality of inertial sensor data samples.

Calculating the recursive maximum value may include: setting the recursive maximum value for the current sample to a threshold value in response to a value of the current sample being less than the threshold value; setting the recursive maximum value for the current sample to the value of the current sample in response to the value of the current sample being greater than a preceding recursive maximum value for a preceding sample of the plurality of inertial sensor data samples; and setting the recursive maximum value for the current sample to a sum of the threshold value with the preceding recursive maximum value less the threshold value multiplied by a maximum coefficient in response to the value of the current sample being less than or equal to the preceding recursive maximum value. The method may further include: setting the maximum coefficient to a default coefficient value in response to the value of the current sample being greater than the preceding recursive maximum value; and setting the maximum coefficient to a product of the maximum coefficient and the default coefficient value in response to the value of the current sample being less than or equal to the preceding recursive value.

Recursively calculating the plurality of features over time may include calculating a recursive minimum value over the plurality of inertial sensor data samples. Calculating the recursive minimum value may include: setting the recursive minimum value for the current sample to a threshold value in response to a value of the current sample being greater than the threshold value; setting the recursive minimum value for the current sample to the value of the current sample in response to the value of the current sample being less than a preceding recursive minimum value for a preceding sample of the plurality of inertial sensor data samples; and setting the recursive minimum value for the current sample to a difference of the threshold value with the threshold value less the preceding recursive minimum value multiplied by a minimum coefficient in response to the value of the current sample being greater than or equal to the preceding recursive minimum value. The method may further include: setting the minimum coefficient to a default coefficient value in response to the value of the current sample being less than the preceding recursive minimum value; and setting the minimum coefficient to a product of the minimum coefficient and the default coefficient value in response to the value of the current sample being greater than or equal to the preceding recursive value.

Recursively calculating the plurality of features over time may include calculating a recursive peak to peak value over the plurality of inertial sensor data samples between a recursive maximum value and a recursive minimum value.

Recursively calculating the plurality of features over time may include calculating a recursive average of the plurality of inertial sensor data samples over time. Calculating the recursive average may include calculating an infinite impulse response low pass filter over the plurality of inertial sensor data samples.

Recursively calculating the plurality of features over time may include calculating a recursive root mean square of the plurality of inertial sensor data samples over time. Calculating the recursive root mean square may include calculating a square root of an infinite impulse response low pass filter over a square of the plurality of inertial sensor data samples.

Recursively calculating the plurality of features over time may include calculating a recursive variance of the plurality of inertial sensor data samples over time. Calculating the recursive variance may include calculating a difference between a first infinite impulse response low pass filter over a square of the plurality of inertial sensor data samples and a squared second infinite impulse response low pass filter over the plurality of inertial sensor data samples.

A system may be summarized as including: an infinite impulse response module that is configured to calculate a recursive average of an input signal, a recursive root mean square of the input signal, and a recursive variance of the input signal; a recursive maximum module that is configured to calculate a recursive maximum value of the input signal; a recursive minimum module that is configured to calculate a recursive minimum value of the input signal; and a difference module that is configured to calculate a recursive peak-to-peak value of the input signal from the recursive maximum value and the recursive minimum value.

The system may further include: a training module that is configured to train a machine learning algorithm to detect known classes based on a plurality of features calculated over time from the recursive average of the input signal, the recursive root mean square of the input signal, the recursive variance of the input signal, the recursive maximum value of the input signal, the recursive minimum value of the input signal, and the recursive peak-to-peak value of the input signal.

The infinite impulse response module may include: a first infinite impulse response filter module that may be configured to calculate a first infinite impulse response output signal from the input signal as the recursive average of the input signal; a first square module that may be configured to calculate a square of the input signal; a second infinite impulse response filter module that may be configured to calculate a second infinite impulse response output signal from the squared input signal; a second square module that may be configured to calculate a square of the first infinite impulse response output signal; a second difference module that may be configured to calculate a difference between the squared first infinite impulse response output signal and the second infinite impulse response output signal as the recursive variance; and a square root module that may be configured to calculate a square root of the second infinite impulse response output signal as the recursive root mean square.

The recursive maximum module may include: a first maximum function module that may be configured to generate a first output that may be a maximum value between a current sample value of the input signal and a preceding recursive maximum value and to generate a second output that indicates whether the current sample value of the input signal may be greater than the preceding recursive maximum value; a second maximum function module that may be configured to generate a third output that may be a maximum value between the first output and a threshold value; a second difference module that may be configured to generate a fourth output that may be a difference between the threshold value and the preceding recursive maximum value; a multiplier module that may be configured to generate a fifth output that may be a product of the fourth output and a maximum coefficient; an adder module that may be configured to generate a sixth output that may be a sum of the fifth output and the threshold value; and a multiplexer module that may be configured to select the third output as the recursive maximum value in response to the second output indicating that the current sample value may be greater than the preceding recursive maximum value or to select the sixth output as the recursive maximum value in response to the second output indicating that the current sample value may be not greater than the preceding recursive maximum value.

The recursive minimum module may include: a first minimum function module that may be configured to generate a first output that is a minimum value between a current sample value of the input signal and a preceding recursive minimum value and to generate a second output that indicates whether the current sample value of the input signal may be less than the preceding recursive minimum value; a second minimum function module that may be configured to generate a third output that may be a minimum value between the first output and a threshold value; a second difference module that may be configured to generate a fourth output that is a difference between the threshold value and the preceding recursive minimum value; a multiplier module that may be configured to generate a fifth output that may be a product of the fourth output and a minimum coefficient; an third difference module that may be configured to generate a sixth output that may be a difference between threshold value and the fifth output; and a multiplexer module that may be configured to select the third output as the recursive minimum value in response to the second output indicating that the current sample value may be less than the preceding recursive minimum value or to select the sixth output as the recursive minimum value in response to the second output indicating that the current sample value may be not less than the preceding recursive minimum value.

A non-transitory computer-readable medium having contents that configure a microcontroller to perform a method, the method may be summarized as including: receiving an input signal from an inertial sensor; receiving labeling data indicating a known class associated with the input signal; recursively calculating a plurality of features over time based on an analysis of the input signal, including: generating a recursive maximum value of the input signal over time; generating a recursive minimum value of the input signal over time; generating a recursive peak-to-peak value of the input signal over time from the recursive maximum value and the recursive minimum value; generating a recursive average of an input signal over time; generating a recursive root mean square of the input signal over time; and generating a recursive variance of the input signal over time; and training a machine learning algorithm to detect the known class based on the calculated plurality of features.

A method may be summarized as including: receiving a plurality of inertial sensor data samples over time; employing a classification model on the inertial sensor data to classify the inertial sensor data as a known class of a plurality of know classes, including recursively calculating a plurality of features over time based on an analysis of sequential samples of the plurality of inertial sensor data samples, including for each current sample of the plurality of inertial sensor data samples, calculating a current feature value for each corresponding feature of the plurality of features based on a comparison between a previous recursive feature value for the corresponding feature and the current sample; identifying the known class based on a comparison between the recursively calculated plurality of features and the classification model.

Recursively calculating the plurality of features over time may include calculating a recursive maximum value over the plurality of inertial sensor data samples. Calculating the recursive maximum value may include: setting the recursive maximum value for the current sample to a threshold value in response to a value of the current sample being less than the threshold value; setting the recursive maximum value for the current sample to the value of the current sample in response to the value of the current sample being greater than a preceding recursive maximum value for a preceding sample of the plurality of inertial sensor data samples; and setting the recursive maximum value for the current sample to a sum of the threshold value with the preceding recursive maximum value less the threshold value multiplied by a maximum coefficient in response to the value of the current sample being less than or equal to the preceding recursive maximum value. The method may further include: setting the maximum coefficient to a default coefficient value in response to the value of the current sample being greater than the preceding recursive maximum value; and setting the maximum coefficient to a product of the maximum coefficient and the default coefficient value in response to the value of the current sample being less than or equal to the preceding recursive value.

Recursively calculating the plurality of features over time may include calculating a recursive minimum value over the plurality of inertial sensor data samples. Calculating the recursive minimum value may include: setting the recursive minimum value for the current sample to a threshold value in response to a value of the current sample being greater than the threshold value; setting the recursive minimum value for the current sample to the value of the current sample in response to the value of the current sample being less than a preceding recursive minimum value for a preceding sample of the plurality of inertial sensor data samples; and setting the recursive minimum value for the current sample to a difference of the threshold value with the threshold value less the preceding recursive minimum value multiplied by a minimum coefficient in response to the value of the current sample being greater than or equal to the preceding recursive minimum value. The method may further include: setting the minimum coefficient to a default coefficient value in response to the value of the current sample being less than the preceding recursive minimum value; and setting the minimum coefficient to a product of the minimum coefficient and the default coefficient value in response to the value of the current sample being greater than or equal to the preceding recursive value.

Recursively calculating the plurality of features over time may include calculating a recursive peak to peak value over the plurality of inertial sensor data samples between a recursive maximum value and a recursive minimum value.

Recursively calculating the plurality of features over time may include calculating a recursive average of the plurality of inertial sensor data samples over time. Calculating the recursive average may include calculating an infinite impulse response low pass filter over the plurality of inertial sensor data samples.

Recursively calculating the plurality of features over time may include calculating a recursive root mean square of the plurality of inertial sensor data samples over time. Calculating the recursive root mean square may include calculating a square root of an infinite impulse response low pass filter over a square of the plurality of inertial sensor data samples.

Recursively calculating the plurality of features over time may include calculating a recursive variance of the plurality of inertial sensor data samples over time. Calculating the recursive variance may include calculating a difference between a first infinite impulse response low pass filter over a square of the plurality of inertial sensor data samples and a squared second infinite impulse response low pass filter over the plurality of inertial sensor data samples.

A computing device may be summarized as including: an infinite impulse response module that is configured to calculate a recursive average of an input signal, a recursive root mean square of the input signal, and a recursive variance of the input signal; a recursive maximum module that is configured to calculate a recursive maximum value of the input signal; a recursive minimum module that is configured to calculate a recursive minimum value of the input signal; and a difference module that is configured to calculate a recursive peak-to-peak value of the input signal from the recursive maximum value and the recursive minimum value; and a classification module that is configured to classify the input signal as a known class based on a comparison between the recursive average of the input signal, the recursive root mean square of the input signal, the recursive variance of the input signal; the recursive maximum value of the input signal; the recursive minimum value of the input signal; and the recursive peak-to-peak value of the input signal.

The infinite impulse response module may include: a first infinite impulse response filter module that may be configured to calculate a first infinite impulse response output signal from the input signal as the recursive average of the input signal; a first square module that may be configured to calculate a square of the input signal; a second infinite impulse response filter module that may be configured to calculate a second infinite impulse response output signal from the squared input signal; a second square module that may be configured to calculate a square of the first infinite impulse response output signal; a second difference module that may be configured to calculate a difference between the squared first infinite impulse response output signal and the second infinite impulse response output signal as the recursive variance; and a square root module that may be configured to calculate a square root of the second infinite impulse response output signal as the recursive root mean square.

The recursive maximum module may include: a first maximum function module that may be configured to generate a first output that is a maximum value between a current sample value of the input signal and a preceding recursive maximum value and to generate a second output that indicates whether the current sample value of the input signal may be greater than the preceding recursive maximum value; a second maximum function module that may be configured to generate a third output that may be a maximum value between the first output and a threshold value; a second difference module that may be configured to generate a fourth output that may be a difference between the threshold value and the preceding recursive maximum value; a multiplier module that may be configured to generate a fifth output that may be a product of the fourth output and a maximum coefficient; an adder module that may be configured to generate a sixth output that may be a sum of the fifth output and the threshold value; and a multiplexer module that may be configured to select the third output as the recursive maximum value in response to the second output indicating that the current sample value may be greater than the preceding recursive maximum value or to select the sixth output as the recursive maximum value in response to the second output indicating that the current sample value may be not greater than the preceding recursive maximum value.

The recursive minimum module may include: a first minimum function module that may be configured to generate a first output that may be a minimum value between a current sample value of the input signal and a preceding recursive minimum value and to generate a second output that indicates whether the current sample value of the input signal may be less than the preceding recursive minimum value; a second minimum function module that may be configured to generate a third output that may be a minimum value between the first output and a threshold value; a second difference module that may be configured to generate a fourth output that may be a difference between the threshold value and the preceding recursive minimum value; a multiplier module that may be configured to generate a fifth output that may be a product of the fourth output and a minimum coefficient; an third difference module that may be configured to generate a sixth output that may be a difference between threshold value and the fifth output; and a multiplexer module that may be configured to select the third output as the recursive minimum value in response to the second output indicating that the current sample value may be less than the preceding recursive minimum value or to select the sixth output as the recursive minimum value in response to the second output indicating that the current sample value may be not less than the preceding recursive minimum value.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   generating, with an inertial sensor, a sequence of inertial sensor data samples;
   providing the sequence of inertial sensor data samples from the inertial sensor to a first circuit, a second circuit, and a third circuit;
   generating, with the first circuit, a recursive maximum value from the sequence of inertial sensor data samples;
   generating, with the second circuit, a recursive minimum value from the sequence of inertial sensor data samples;
   recursively generating, with the third circuit, a plurality of recursive features from the sequence of inertial sensor data samples based on an analysis of sequential samples of the inertial sensor data samples, including:
      for each current sample of the inertial sensor data samples, calculating a current feature value for each corresponding feature of the plurality of recursive features based on a comparison between a previous recursive feature value for the corresponding feature and the current sample;

labeling the inertial sensor data samples with a class; and training a machine learning algorithm to detect the class based on the plurality of recursive features.

2. The method of claim 1, wherein generating the recursive maximum value includes;

setting the recursive maximum value for the current sample to a threshold value in response to a value of the current sample being less than the threshold value;

setting the recursive maximum value for the current sample to the value of the current sample in response to the value of the current sample being greater than a preceding recursive maximum value for a preceding sample of the plurality of inertial sensor data samples; and setting the recursive maximum value for the current sample to a sum of the threshold value with the preceding recursive maximum value less the threshold value multiplied by a maximum coefficient in response to the value of the current sample being less than or equal to the preceding recursive maximum value.

3. The method of claim 2, comprising:

setting the maximum coefficient to a default coefficient value in response to the value of the current sample being greater than the preceding recursive maximum value; and setting the maximum coefficient to a product of the maximum coefficient and the default coefficient value in response to the value of the current sample being less than or equal to the preceding recursive value.

4. The method of claim 1, wherein generating the recursive minimum value includes;

setting the recursive minimum value for the current sample to a threshold value in response to a value of the current sample being greater than the threshold value;

setting the recursive minimum value for the current sample to the value of the current sample in response to the value of the current sample being less than a preceding recursive minimum value for a preceding sample of the plurality of inertial sensor data samples; and setting the recursive minimum value for the current sample to a difference of the threshold value with the threshold value less the preceding recursive minimum value multiplied by a minimum coefficient in response to the value of the current sample being greater than or equal to the preceding recursive minimum value.

5. The method of claim 4, comprising:

setting the minimum coefficient to a default coefficient value in response to the value of the current sample being less than the preceding recursive minimum value; and setting the minimum coefficient to a product of the minimum coefficient and the default coefficient value in response to the value of the current sample being greater than or equal to the preceding recursive value.

6. The method of claim 1, wherein recursively generating the plurality of recursive features includes:

calculating a recursive peak to peak value over the inertial sensor data samples between the recursive maximum value and the recursive minimum value.

7. The method of claim 1, wherein recursively generating the plurality of recursive features includes:

calculating a recursive average of the inertial sensor data samples.

8. The method of claim 7, wherein calculating the recursive average includes:

calculating an infinite impulse response low pass filter over the inertial sensor data samples.

9. The method of claim 1, wherein recursively generating the plurality of recursive features includes:

calculating a recursive root mean square of the inertial sensor data samples.

10. The method of claim 9, wherein calculating the recursive root mean square includes:

calculating a square root of an infinite impulse response low pass filter over a square of the inertial sensor data samples.

11. The method of claim 1, wherein recursively generating the plurality of recursive features includes:

calculating a recursive variance of the inertial sensor data samples.

12. The method of claim 11, wherein calculating the recursive variance includes:

calculating a difference between a first infinite impulse response low pass filter over a square of the inertial sensor data samples and a squared second infinite impulse response low pass filter over the inertial sensor data samples.

13. A system, comprising:

one or more processors; and memory storing contents that, when executed by the one or more processors, cause the system to perform actions comprising:

generating, with an inertial sensor, a sequence of inertial sensor data samples;

providing the sequence of inertial sensor data samples from the inertial sensor to a first circuit, a second circuit, and a third circuit;

generating, with the first circuit, a recursive maximum value from the sequence of inertial sensor data samples;

generating, with the second circuit, a recursive minimum value from the sequence of inertial sensor data samples;

recursively generating, with the third circuit, a plurality of recursive features from the sequence of inertial sensor data samples based on an analysis of sequential samples of the inertial sensor data samples, including:

for each current sample of the inertial sensor data samples, calculating a current feature value for each corresponding feature of the plurality of recursive features based on a comparison between a previous recursive feature value for the corresponding feature and the current sample;

labeling the inertial sensor data samples with a class; and training a machine learning algorithm to detect the class based on the plurality of recursive features.

14. A method, comprising:

generating, with an inertial sensor, a sequence of inertial sensor data samples;

providing the sequence of inertial sensor data samples from the inertial sensor to a first circuit, a second circuit, and a third circuit;

generating, with the first circuit, a recursive maximum value from the sequence of inertial sensor data samples;

generating, with the second circuit, a recursive minimum value from the sequence of inertial sensor data samples;

employing a classification model on the inertial sensor data to classify the inertial sensor data as a class of a plurality of classes, including:
   recursively generating, with the third circuit, a plurality of recursive features from the sequence of inertial sensor data samples based on an analysis of sequential samples of the inertial sensor data samples, including:
      for each current sample of the inertial sensor data samples, calculating a current feature value for each corresponding feature of the plurality of recursive features based on a comparison between a previous recursive feature value for the corresponding feature and the current sample;
   identifying the class based on a comparison between the plurality of recursive features and the classification model.

15. The method of claim 14, wherein recursively generating the plurality of recursive features includes:
   calculating a recursive root mean square of the inertial sensor data samples.

16. The method of claim 14, wherein recursively generating the plurality of recursive features includes:
   calculating a recursive variance of the inertial sensor data samples.

* * * * *